(12) United States Patent
Lee

(10) Patent No.: US 11,318,668 B2
(45) Date of Patent: May 3, 2022

(54) METHOD FOR 3D PRINTING USING PHOTO-POLYMER AND AN APPARATUS THEREOF

(71) Applicant: Byung-keuk Lee, Seoul (KR)

(72) Inventor: Byung-keuk Lee, Seoul (KR)

(*) Notice: Subject to any disclaimer, the term of this patent is extended or adjusted under 35 U.S.C. 154(b) by 0 days.

(21) Appl. No.: 15/121,191

(22) PCT Filed: Feb. 27, 2015

(86) PCT No.: PCT/KR2015/001958
§ 371 (c)(1),
(2) Date: Aug. 24, 2016

(87) PCT Pub. No.: WO2015/130139
PCT Pub. Date: Sep. 3, 2015

(65) Prior Publication Data
US 2016/0368206 A1    Dec. 22, 2016

(30) Foreign Application Priority Data
Feb. 28, 2014    (KR) .................... 10-2014-0024109

(51) Int. Cl.
| B29C 64/129 | (2017.01) |
| B33Y 10/00 | (2015.01) |
| B33Y 30/00 | (2015.01) |
| B29K 105/00 | (2006.01) |

(52) U.S. Cl.
CPC ............ B29C 64/129 (2017.08); B33Y 10/00 (2014.12); B33Y 30/00 (2014.12); B29K 2105/0058 (2013.01)

(58) Field of Classification Search
CPC ..... B29C 67/007; B29C 64/129; B33Y 10/00; B33Y 30/00; B29K 2105/0058
See application file for complete search history.

(56) References Cited

U.S. PATENT DOCUMENTS

2013/0249146 A1* 9/2013 Zenere et al. ...... B29C 67/0066

FOREIGN PATENT DOCUMENTS

WO    WO-2014126837 A2 *    8/2014 ........... G03F 7/0037

* cited by examiner

*Primary Examiner* — Robert S Walters, Jr.
(74) *Attorney, Agent, or Firm* — Sughrue Mion, PLLC

(57) ABSTRACT

The present invention relates to a method and apparatus for 3D printing using a photopolymer. An aspect of the present invention is to provide a method and apparatus for 3D printing using a photopolymer, which can shorten time taken in forming a sculpture body. To this end, the method of 3D printing using a photopolymer, which forms a sculpture body using a liquid photopolymer resin filled in a resin tank having a transparent bottom plate, wherein the sculpture body is stacked to form layers on a bed, comprises lifting up the bed with respect to the bottom plate of the resin tank within an at least partial thickness range of a unit shaping layer and forming the at least partial thickness range of the unit shaping layer during a layer image light for the unit shaping layer is being emitted.

8 Claims, 4 Drawing Sheets

METHOD FOR 3D PRINTING USING PHOTO-POLYMER AND AN APPARATUS THEREOF

REFERENCE TO RELATED APPLICATIONS

This application is a U.S. National Phase application of International Application No. PCT/KR2015/001958, filed Feb. 27, 2015, and claims priority to Korean Patent Application No. 10-2014-0024109, filed Feb. 28, 2014, the disclosures of each of these applications being incorporated herein by reference.

FIELD OF THE INVENTION

The present invention relates to a method and an apparatus for 3D printing using a photopolymer.

BACKGROUND OF THE INVENTION

A 3D printing apparatus using a photopolymer includes a resin tank having a transparent bottom plate and filled with a liquid photopolymer resin to be cured by exposure to light, and a bed placed inside the resin tank movable up and down with respect to the bottom plate. In an initial stage, the bed is spaced apart from the bottom plate by a unit shaping layer. In this state, if the bottom plate is exposed by an image light, the resin between the bed and the bottom plate is cured. Then, the bed is lifted up again with respect to the bottom plate so that a space between a lower surface of the previously-stacked unit shaping layer and the bottom plate can be equal to the thickness of the following unit shaping layer, and the curing process is performed by exposure to the next image light.

In a conventional 3D printing apparatus, the bed is moved up to a certain height so that a liquid resin can be filled in between one previously-stacked unit shaping layer and the bottom plate, and then moved down again so that the space between the lower surface of the previously formed unit shaping layer and the bottom plate can be equal to the thickness of the following unit shaping layer. Thus, the conventional 3D printing apparatus has to take considerable time to move the bed up and down. In addition, a sculpture has a rough outer surface since new unit shaping layers are sequentially stacked on the completely-cured unit shaping layer.

SUMMARY OF THE INVENTION

An aspect of the present invention is to provide a method and an apparatus for 3D printing using a photopolymer, which can shorten time taken in forming a sculpture.

Another aspect of the present invention is to provide a method and an apparatus for 3D printing using a photopolymer, which can make a sculpture having a smooth surface.

In accordance with an embodiment of the present invention, a method of 3D printing using a photopolymer, which forms a sculpture body using a liquid photopolymer resin filled in a resin tank having a transparent bottom plate, wherein the sculpture body is stacked to form layers on a bed, comprises: lifting up the bed with respect to the bottom plate of the resin tank within an at least partial thickness range of a unit shaping layer and forming the at least partial thickness range of the unit shaping layer during a layer image light for the unit shaping layer is being emitted.

Here, the bed is continuously lifted up, so that time taken in forming a sculpture body can be more shortened.

Further, the bed is intermittently lifted up by a plurality of steps, so that the unit shaping layer can be more stably formed.

In addition, the liquid resin is heated while forming the unit shaping layer, so that the liquid resin can have low viscosity and thus rapidly permeate a space between the bottom plate and the previously formed unit shaping layer.

In accordance with another embodiment of the present invention, an apparatus for 3D printing using a photopolymer, which forms a sculpture body by stacking a plurality of unit shaping layers comprising: a resin tank which comprises a transparent bottom plate and is filled with a liquid photopolymer resin; a bed which has a lower surface parallel with the bottom plate and is movable up and down inside the resin tank; a lifting driver which drives at least one of the resin tank and the bed to move up and down; an image light emitter which is placed under the resin tank and emits a layer image light toward the bottom plate; and a controller which controls the lifting driver to lift up the bed with respect to the bottom plate of the resin tank within an at least partial thickness range of the unit shaping layer during the layer image light for a single unit shaping layer is emitted.

The apparatus further include a heater to increase temperature of the liquid photopolymer resin, so that the liquid resin can have low viscosity and thus rapidly permeate a space between the bottom plate and the previously formed unit shaping layer.

With the method and apparatus for 3D printing using a photopolymer according to the present invention, it is possible to shorten time taken in making a sculpture body, and it is also possible to make a sculpture body having a smooth surface.

DETAILED DESCRIPTION OF THE INVENTION

Figure 1:
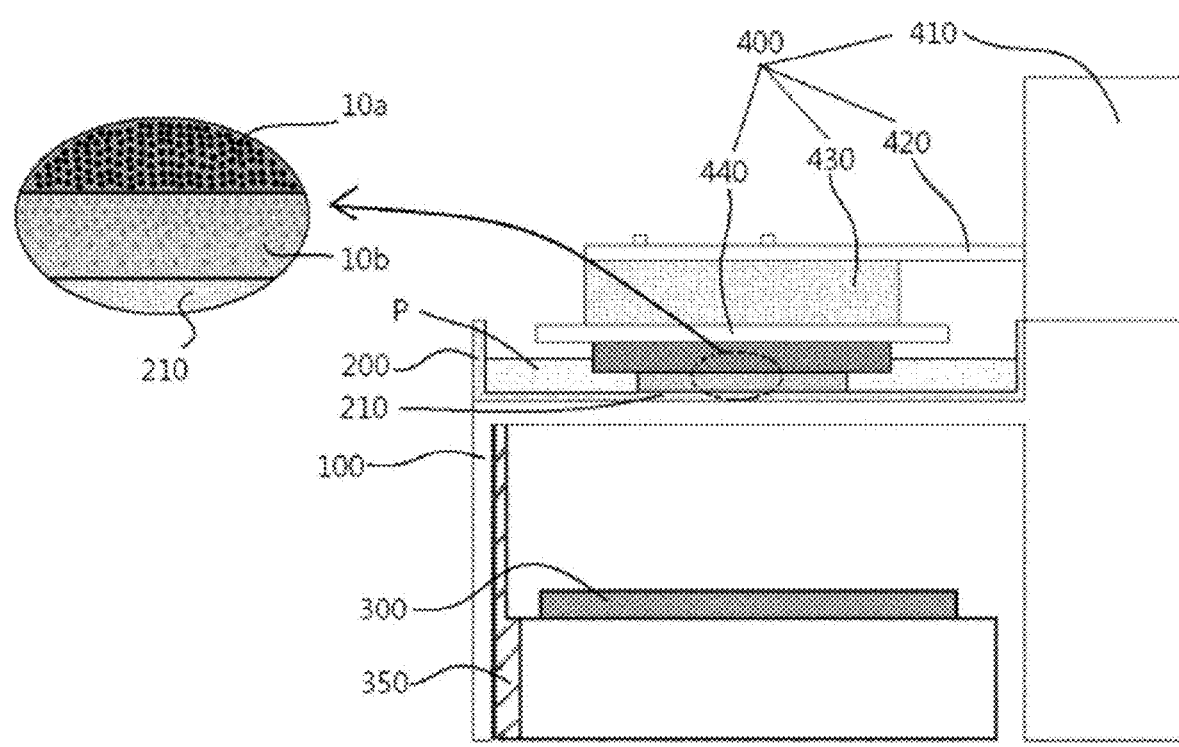
FIG. 1 is a conceptual view of a 3D printing apparatus using a photopolymer according to the present invention.

FIG. 1 is a conceptual view of a 3D printing apparatus using a photopolymer according to the present invention. As shown in FIG. 1, the present 3D printing apparatus includes a resin tank 200 having a transparent bottom plate 210 and filled with a liquid photopolymer resin. The resin tank 200 is supported on a frame 100. The frame 100 supports the resin tank 200 at an edge area of the bottom plate 210.

The liquid photopolymer resin contains a polymerization initiator and a polymerization inhibitor. When the liquid photopolymer resin is exposed to light, the polymerization initiator is decomposed to form radicals. The radicals generated by the polymerization initiator initially react with dissolved oxygen and the polymerization inhibitor. When dissolved oxygen and the polymerization inhibitor are consumed by the radicals, the radicals react with and polymerize the liquid photopolymer resin, thereby curing the liquid resin. An additional amount of polymerization initiator and polymerization inhibitor may be varied depending on printing methods. Here, a period from time when the radical reacts with the liquid photopolymer resin to time before the liquid photopolymer resin polymerizes will be called an induction period. The liquid resin may be added with a release agent.

Under the resin tank 200, an image light emitter 300 is arranged to emit image light toward the bottom plate 210. The image light emitter 300 emits light needed for curing the liquid photopolymer resin. The image light emitter 300 may be achieved by a liquid crystal display (LCD), a light emitting diode (LED), a digital micromirror device (DMD) or the like display device capable of emitting light. The image light emitter 300 is controlled by a controller to emits layer-image light corresponding to the unit shaping layer toward the bottom plate 210.

The frame 100 is provided with a lifting unit 400 having a bed 440 capable of moving up and down along a vertical direction within an inner area of the resin tank 200. The bed 440 has a lower surface parallel with the bottom plate 210. The lifting unit 400 includes a lifting driver 410 for driving the bed 440 to move up and down. The lifting driver 410 includes a lifting arm 420 movable up and down in a height direction. The lifting arm 420 couples with the bed 440 and an intermediator 430. The intermediator 430 adjusts the bed 440 to be parallel with the bottom plate 210 and prevents shaking when the bed 440 moves up and down. Alternatively, the lifting unit 400 may couple with the resin tank 200 so that the resin tank 200 can move up and down with respect to the bed 440.

The resin tank 200 is provided with an electric heater 350 to increase the temperature of the liquid photopolymer resin. The electric heater 350 is in contact with each of the image light emitter and the resin tank, and transfers heat generated in the image light emitter 300 or a separate heating device to the resin tank 200. Thus, the liquid resin P filled in the resin tank 200 is increased in temperature to have low viscosity. If the liquid resin P has low viscosity, the liquid resin P can easily permeate a space between the bed 440 and the bottom plate 210. The resin tank 200 may be additionally provided with a separate heater.

In addition, the present 3D printing apparatus includes a feeder for feeding a liquid thermosetting resin P into the resin tank 200. Further, the controller may control the lifting driver 410 and the feeder to interwork with each other.

The present 3D printing apparatus may further include a fluid guider movable up and down inside the resin tank 200 and guiding the liquid thermosetting resin P to flow downward.

With such a structure, the 3D printing apparatus using a photopolymer makes a 3D sculpture body as follows.

First, the controller controls the feeder to feed the liquid photopolymer resin P into the resin tank 200. Alternatively, a user may voluntarily put the liquid resin P into the resin tank 200. At this time, the liquid photopolymer resin P is put as much as the thickness of at least one unit shaping layer. Further, the controller immerses the bed 440 in the liquid resin P so that the space between the bed 440 and the bottom plate 210 can be equal to a partial thickness of at least single unit shaping layer.

Next, the controller controls the image light emitter 300 to emit a single first-layer image light toward the bottom plate 210. If the single first-layer image light is emitted, the liquid photopolymer resin P is cured through the induction period. At this time, the controller gradually lifts up the bed 440 from the bottom plate 210 within an at least partial thickness range of the unit shaping layer before a first single unit shaping layer is completely cured.

Figure 2:
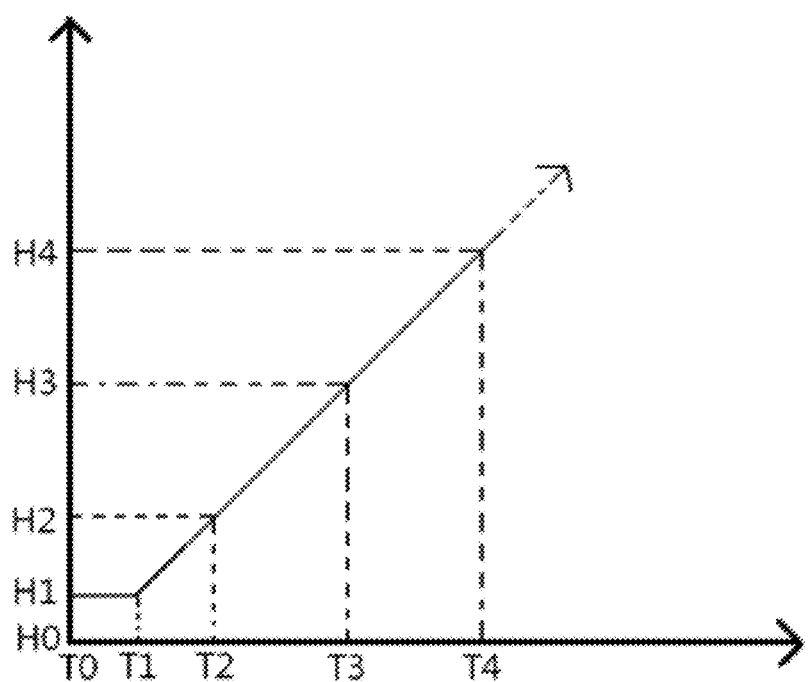
FIG. 2 to FIG. 4 are graphs showing height of a bed versus curing time.

FIG. 2 is a graph showing the height of the bed 440 versus time. As shown in FIG. 2, the bed 440 is arranged leaving a space (from H0 to H1) as much as the at least partial thickness of a first shaping layer 10a from the bottom plate 210. In this state, the controller controls the image light emitter 300 to emit the first-layer image light toward the bottom plate 210, and gradually lifts up the bed 440 at a time T1 when the liquid resin P is partially cured. If the bed 440 is lifted up in the state that the first unit shaping layer is partially cured, the capillary action causes the liquid resin to flow in a narrow space between the first unit shaping layer and the bottom plate 210.

The controller continues to gradually lift up the bed 440. While continuing to lift up the bed 440, the controller controls the image light emitter 300 to emit second-layer image light at a time T2 when the bed 440 and the bottom plate 210 are spaced apart from each other as much as the first shaping layer 10a. That is, the thickness of the first shaping layer 10a is equal to a distance from H0 to H2. A second shaping layer 10b is formed starting from the lower surface of the first shaping layer 10a.

In this manner, the controller does not stop the bed 440 but continuously lifts up the bed 440, thereby stacking a plurality of shaping layers such as the first shaping layer 10a, the second shaping layer 10b, and so on. Since the light is continuously emitted, one between the first shaping layer 10a and the second shaping layer 10b is more cured as it forms an upper layer and less cured as it gets closer to the bottom plate 210.

As necessary, the controller may change a speed of lifting up the bed 440. For example, the bad 440 may be lifted up at a low speed in the beginning and at a relatively high speed in the end whenever the unit shaping layer is cured. Like this, if the bed 440 is continuously lifted up, the controller continuously changes the layer image light emitted by the image light emitter 300.

Figure 3:
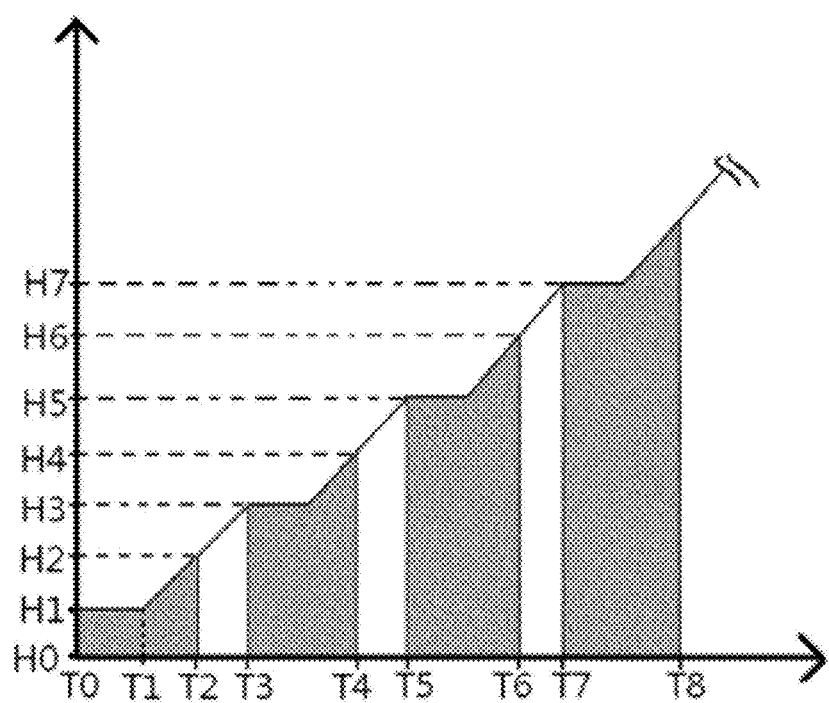

FIG. 3 is a graph showing height of the bed 440 versus time according to another embodiment. As shown in FIG. 3, the bed 440 may be intermittently lifted up by a plurality of steps.

First, the first shaping layer is partially cured by emitting the first-layer image light for a predetermined period of time in the state that the bed 440 is arranged leaving a space (from H0 to H1) as much as an at least partial thickness range of the first shaping layer from the bottom plate 210. Further, the controller gradually lifts up the bed 440 in the state T1 that the first shaping layer is partially cured. The controller turns off the image light emitter 300 at a proper point of time T2 while gradually lifting up the bed 440, and gradually lifts the bed 440 up as much as a predetermined height H3. Here, the height (from H2 to H3), by which the bed 440 is lifted up in the state that the first-layer image light is turned off, is a space between the lower surface of the first shaping layer and the bottom plate, i.e. an at least partial thickness range of the second shaping layer. The first shaping layer is formed to have a thickness as much as a height (from H0 to H2) for a period of time (from T0 to T2) during which the first-layer image light is emitted.

Then, the second shaping layer is partially cured by emitting the second-layer image light for a predetermined period of time in the state that a space between the lower surface of the first shaping layer and the bottom plate 210 is equal to a space (H3−H2) as much as an at least partial thickness range of the second shaping layer. Further, the bed 440 is gradually lifted up in the state that the second shaping layer is partially cured. The second image light is turned off at a proper point of time T4 while gradually lifting up the bed 440, and gradually lifts the bed up as much as a predetermined height H5. Here, the height (H5−H4), by which the bed 440 is lifted up in the state that the second-layer image light is turned off, is a space between the lower surface of the second shaping layer and the bottom plate 210, i.e. an at least partial thickness range of a third shaping layer.

The second shaping layer is formed to have a thickness as much as a height (from H2 to H4) for a period of time (from T3 to T4) during which the second-layer image light is emitted.

The third shaping layer is partially cured by emitting third-layer image light for a predetermined period of time in the state that a space between the lower surface of the second shaping layer and the bottom plate 210 is equal to a space (H5–H4) as much as an at least partial thickness range of the third shaping layer. The subsequent stacking processes of the following shaping layers to be stacked in sequence are equivalent to the foregoing stacking processes of the first shaping layer and the second shaping layer.

By the way, the bed may be intermittently lifted up while light is continuously emitted without intervals from T2 to T3, from T4 to T5 and from T6 to T7 during which no light is emitted. In this case, the shaping layer adjacent to the bottom plate 210 has to be not completely cured while the bed 440 stops moving.

With such a stacking method as shown in FIG. 3, the present 3D printing method using a photopolymer can make a 3D sculpture body by only lifting and stopping the bed 440 without moving the bed 440 up to a predetermined height and moving it down again.

Figure 4:
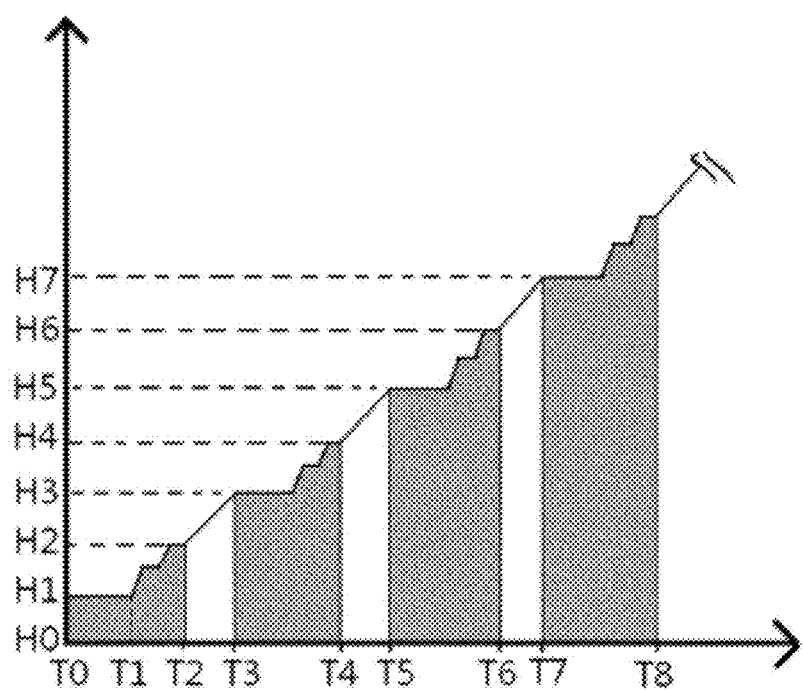

Alternatively, as shown in FIG. 4, the bed 440 may be intermittently lifted up by a plurality of steps while layer image light for one unit shaping layer is emitted. In this case, the unit shaping layer can be more stably formed than that shown in FIG. 3.

What is claimed is:

1. A 3D printing apparatus comprising:
    a resin tank comprising a transparent bottom plate and filled with a liquid photopolymer resin;
    an object bed initially within the resin tank with a gap between a lower surface of the object bed and the transparent bottom plate of the resin tank;
    a lifting driver for driving at least one of the resin tank or the object bed to change the gap between the lower surface of the object bed and the transparent bottom plate of the resin tank;
    an image light emitter placed under the resin tank for emitting at least one of a first-layer image light or a second-layer image light toward the transparent bottom plate; and
    a controller configured to control the image light emitter to emit the first-layer image light toward the transparent bottom plate, and control the lifting driver to lift the object bed with respect to the transparent bottom plate of the resin tank when the liquid photopolymer resin in the gap between the lower surface of the object bed and the transparent bottom plate of the resin tank reaches a partially cured state,
    wherein the controller is further configured to control the image light emitter to:
        maintain emitting the first-layer image light toward the transparent bottom plate for a certain period of time while the object bed is being lifted until the gap between the lower surface of the object bed and the transparent bottom plate of the resin tank reaches a first height to form a first unit layer;
        based on the gap between the lower surface of the object bed and the transparent bottom plate of the resin tank reaching the first height, turn off the image light emitter and control the lifting driver to continue to lift the object bed until the gap between the lower surface of the object bed and the transparent bottom plate of the resin tank reaches a second height to form a first portion of a second unit layer; and
        based on the gap between the lower surface of the object bed and the transparent bottom plate of the resin tank reaching the second height, turn on the image light emitter to emit the second-layer image light while controlling the lifting driver to lift the object bed to form a second portion of the second unit layer, until the gap between the lower surface of the object bed and the transparent bottom plate of the resin tank reaches a third height, the second unit layer having a thickness corresponding to a difference between the third height and the first height, and
    wherein the controller is further configured to control the lifting driver to change a speed of lifting the object bed during emitting the first-layer image light and the second-layer image light to the transparent bottom plate.

2. The 3D printing apparatus according to claim 1, wherein the controller is configured to lift the object bed continuously.

3. The 3D printing apparatus according to claim 1, wherein the controller is configured to lift the object bed intermittently by a plurality of steps.

4. The 3D printing apparatus according to claim 1, wherein the liquid photopolymer resin is heated while the 3D printing apparatus is operated.

5. The 3D printing apparatus according to claim 1, wherein the liquid photopolymer resin in the gap between the transparent bottom plate and the object bed is partially cured by the first-layer image light and forms a partially cured layer of the partially cured state and attached to the object bed and lifted up with the object bed and produces another gap between the transparent bottom plate and a bottom surface of the partially cured layer and the liquid photopolymer resin flows within the another gap by a capillary action of the liquid photopolymer resin.

6. The 3D printing apparatus according to claim 5, wherein the partially cured layer attached to the object bed is completely cured while a 3D printing method is progressed during the lifting up of the object bed.

7. The 3D printing apparatus according to claim 1, wherein the controller is configured to control the lifting driver to lift the object bed at a first speed at a beginning stage of emitting the first-layer image light and the second-layer image light, and at a second speed higher than the first speed at an ending stage of emitting the first-layer image light and the second-layer image light.

8. The 3D printing apparatus according to claim 1, wherein the liquid photopolymer resin is added with a release agent to facilitate releasing the partially cured photopolymer resin from the transparent bottom plate of the resin tank.

* * * * *